Patented Dec. 17, 1940

2,224,942

UNITED STATES PATENT OFFICE 2,224,942

COFFEE AND THE METHOD OF PREPARING THE SAME

Maurice Weisman, Roxbury, Mass.

No Drawing. Application February 4, 1937, Serial No. 124,042

6 Claims. (Cl. 99—167)

The present invention relates to the treatment of coffee and more particularly to a process for preparing the coffee for more convenient table use. Coffee is customarily prepared for drinking as a beverage by a number of different methods, such as percolation, drip method and boiling a ground coffee in water for a very few minutes. As a rule when coffee is used in any of these manners, approximately about a table-spoonful or more is necessary for each individual cup. It is practically imposible to make a cup of coffee for table use by putting some coffee in a cup and pouring boiling water over it as it is quite often done for instance in preparing a cup of tea. It is practically impossible to prepare coffee in the same way that tea is prepared for a number of reasons. In the first place the coffee occupies too great a space in comparison to the water in the cup; secondly, ordinarily the water will cool before the coffee becomes sufficiently strong. In the third place the coffee grounds usually absorb so much water that a good part of the water is used up and very little liquid remains. This is quite different from the brewing of a cup of tea where a small tea bag may be used and the water in the cup becomes quite strong in a very short time without very much absorption of water by the tea leaves. Attempts have been made to overcome these difficulties, particularly as illustrated by the use of coffee crystals where the coffee is dehydrated and made into such a form that most of the water and cellulose woody structure is withdrawn and only the soluble coffee crystals remain. Unfortunately the dehydration of coffee carries with it certain volatile constituents which are essential in the production of the fine bouquet or flavor that is usually associated with coffee prepared in the usual way and while therefore the coffee extract or crystals may be used in preparing individual cups of coffee simply by pouring the hot water over them, nevertheless something very essential is lost by this process in coffee flavor.

Other methods besides the one just mentioned above have been tried, as for instance the mixing of dehydrated coffee with ground coffee in an effort to replace principally the aroma and flavor lost by the dehydration process. Unfortunately such a preparation must be specially handled, principally because the ground coffee is subjected to oxidation effects and to the usual deterioration and staling of ordinary ground coffee. This method requires expensive methods of packing either by hermetically sealing in an inert gas like carbon dioxide or by vacuum packing. Moreover the soluble dehydrated coffee crystals which are mixed with the ground coffee are of a hygroscopic nature and through the exposure of the coffee crystals to the atmosphere, allow an absorption of moisture which mats solidly and closes up the interstices between the particles of ground coffee retarding the circulation of water when making coffee. This effect makes it difficult to prepare coffee in individual bags as tea is prepared in balls or bags for individual cup use so that at the present time for the most part coffee is still sold in sealed containers in bulk or in crystal form.

In the present invention I have devised a method of preparing coffee so that the coffee is concentrated in sufficiently small volume that approximately a tea-spoonful of the preparation in a bag similar to a tea bag may be used in the preparation of a single cup of coffee, hot or cold, simply by the addition of hot or cold water. Coffee prepared in this way, according to my invention not only retains its original aroma and bouquet, but also provides a cup of coffee of full strength without deterioration in ordinary packages and with very much less coffee used. The coffee according to the present invention may be described briefly as coffee sealed coffee in which a concentrated coffee extract is sealed into the coffee grounds in such a way that the porous cells of the grounds themselves are completely sealed with the coffee extract and most of the coffee extract on the other hand is also completely sealed from the air to which it might be exposed.

The invention relating to the process of the present invention will be more fully learned and understood from the description given of the process.

Coffee of the desired nature is prepared by grinding to the desired granular size, which is preferably just larger than the mesh of the coffee bag in which the coffee is ultimately placed for individual cup use. A concentrated extract is made of the same kind or different kind of coffee as that ground. The ground coffee is then treated by a vacuum process to draw out some of the occluded air and gases and simultaneously therewith is filled with the coffee extract or concentrate to give space occupied by these gases a greater soluble coffee content than the coffee normally had. This liquid extract is preferably of a high degree concentration, for example such having a specific gravity of approximately 28° to 29° Baumé. After the coffee grounds are thoroughly impregnated with the coffee extract so that all the interstices and cells of the grounds are filled, the grounds are then dried. This extract may be a blend of coffee different from the fresh grounds or the same, depending upon the nature and flavor of the coffee to be made.

The extract may be decaffeinized in part or in whole or the grounds may be decaffeinized and in fact any soluble type of extract may be used. In place of a pure coffee extract a prepared coffee may be used as for instance a coffee chicory compound or other coffee compound mixtures depending upon the nature of the flavor desired and the various proportions of decaffeinized and caffeinized extract.

This process is preferably repeated a second time with a vacuum of less degree being impressed upon the grounds as a second impregnation takes place. The second impregnation usually fills the interstices of the grounds over the first impregnation and forms a second seal for coating for the grounds effectively sealing the coffee extract within the grounds themselves. The impregnation may in some cases be omitted and the grounds simply soaked with or coated by the extract and then dried.

Since this extract with which these grounds are impregnated usually contains a greater amount of soluble coffee than the grounds themselves, effectively more coffee is concentrated in the grounds than is present in the grounds in the original state.

As an example of the method of coffee concentration in the grounds, supposing that fifteen pounds of coffee were originally used, and that of this amount, ten pounds were used to prepare the concentrated extract, and five pounds were used to prepare the granulated grounds for impregnation or coating with the coffee extract prepared from the ten pounds of coffee, the extract from the ten pounds of coffee may be effectively sealed within or may be applied to the five pounds of grounds so that the entire fifteen pounds of coffee are now substantially decreased in volume to that of five pounds correspondingly concentrating the granulated coffee in a ratio of three to one of soluble coffee content.

In place of the extract dehydrated coffee in the form of crystals may be used, these being slightly dissolved and applied to the coffee granules either effecting a complete impregnation or merely a coating of the coffee granules. The sealing of the grounds both by the first and second impregnation and drying, closes the cells of the grounds to the atmosphere and provides a complete seal of the extract so as to make it impossible for the moisture or air to act upon it. The grounds after being thoroughly dried are packed in individual bags of the size of the ordinary tea bag with about the same volume of coffee in each bag as in a tea bag. Such a bag makes a cup of coffee and may be prepared simply by pouring hot or boiling water into the cup in which the bag is placed. Coffee made in this fashion may also of course be used in other ways. It may be for instance disposed in cans and used by putting a tea-spoonful in each cup of hot or cold water, or by putting the coffee in hot or cold water in such proportions corresponding to a tea-spoonful for the average cup and straining out the exhausted grounds through any porous material. The strength of the coffee may of course be regulated by the amount used. A further advantage may be gained in the present invention by using one kind of grounds and a coffee extract from a different kind of grounds. In fact the second impregnation of coffee extract into the grounds may be from a different coffee than the first extract and in this way blends of various natures can be obtained as may be desired. Preparation of the extract may be of one of the usual processes such as vacuum process, dehydration, percolation, and so forth. Coffee grounds prepared according to the present invention need not be specially packed since moisture will not penetrate the sealed grounds and change the character of the coffee and further the coffee will not be affected by age.

It is also readily understood that since the granules are impregnated with coffee extract, concentrated beyond the natural amount of coffee ground, the amount of coffee actually in the granules is much greater than in the equivalent coffee volume. This makes it readily possible to prepare the coffee in a manner similar to the preparation of tea, since a tea-spoonful is sufficient to make a strong cup of coffee and avoids therefore all difficulties that ordinarily would be present due to the difficulty of extracting the coffee from the granules.

For the reasons given above it is also quite obvious that the coffee will be extracted from the granules merely by the application of hot or cold water in sufficiently short time so that a hot or cold cup of coffee may be obtained.

Having now described my invention, I claim:

1. As an article of manufacture, a prepared coffee comprising ground coffee having cells impregnated and coated with coffee extract, the extract containing an amount of soluble coffee sufficient to completely coat and seal the entire surface of the grounds whereby the cells and each particle of the grounds are completely sealed and coated.

2. A coffee preparation comprising coffee granules impregnated and coated with coffee extract having a degree Baumé between 28 and 29, the extract coating and sealing completely the cells and the entire surface of the grounds.

3. A method of preparing coffee which comprises, first grinding coffee in granular form, then impregnating the coffee by first drawing out the occluded air and gases in the granules and then impregnating and sealing the cells and the outer surface of the granules with a coffee extract having a soluble coffee content of such a proportion that the grounds are completely sealed and coated with a soluble coffee coating.

4. A method of preparing coffee which comprises first grinding coffee in granular form, then impregnating the coffee by first drawing out the occluded air and gases in the granules and then impregnating and sealing the cells and the outer surface of the granules with a coffee extract having an amount of soluble coffee substantially not less than the amount of soluble coffee contained in the granules themselves whereby the grounds and the cells therein are completely impregnated and coated with said soluble coffee.

5. A method of preparing coffee which comprises first grinding the coffee to particles of small size, then impregnating the coffee with a liquid coffee extract having a greater amount of soluble coffee than the granules themselves whereby the grounds have a soluble coffee content not less than double the natural coffee in the granules, then drying the coffee thereby sealing the extract within the granules and completely coating and sealing the entire surface of the granules.

6. A coffee preparation comprising fresh coffee grounds of a small particle size, said grounds having cells free from gases and being impregnated by liquid coffee extract having a greater amount of soluble coffee than that contained in the grounds themselves, and being sealed over their external surface whereby the entire grounds have a completely sealed exterior surface.

MAURICE WEISMAN.